United States Patent [19]

Hirose

[11] 4,367,111
[45] Jan. 4, 1983

[54] SEWING METHOD

[76] Inventor: Tokuzo Hirose, 7-26 Hashimoto-cho, Abenoku, Osaka, Japan

[21] Appl. No.: 181,397

[22] Filed: Aug. 22, 1980

Related U.S. Application Data

[62] Division of Ser. No. 46,631, Jun. 7, 1979, Pat. No. 4,262,836.

[30] Foreign Application Priority Data

Apr. 13, 1979 [JP] Japan ................... 54-45842

[51] Int. Cl.³ .................................. B31F 1/00
[52] U.S. Cl. .................................. 156/221; 29/432.1; 29/798; 156/308.2; 264/249
[58] Field of Search ............... 29/432, 432.1, 432.2, 29/798; 112/228; 227/156, 110, 120; 156/92, 93, 221, 308.2; 264/249

[56] References Cited

U.S. PATENT DOCUMENTS

| | | | |
|---|---|---|---|
| 2,055,249 | 9/1936 | Cavanagh | 29/432.1 |
| 2,079,673 | 5/1937 | Allen | 29/432.1 |
| 2,458,152 | 1/1949 | Eakins | 156/92 X |
| 2,786,201 | 3/1957 | Ehrlich | 227/124 |
| 2,935,434 | 5/1960 | Dawson | 227/156 X |
| 3,074,367 | 1/1963 | Habedank et al. | 112/228 |
| 3,116,487 | 1/1964 | Schick | 227/120 |
| 3,347,730 | 10/1967 | Keller et al. | 227/156 X |

Primary Examiner—Charlie T. Moon
Attorney, Agent, or Firm—Wenderoth, Lind & Ponack

[57] ABSTRACT

This invention relates to a sewing method. Staples or tacks having the function of a sewing thread are first penetrated successively through a work placed on a bed. The staples or tacks are supplied and fed successively from a feeder which is provided over the work. The extremities of the staples or tacks are then transformed so as not to be removed from the work. The penetrating and transforming operations are performed simultaneously at a plurality of points or successively from point to point, whereby seams or patterned seams adjacent to each other are accomplished to sew the work.

1 Claim, 16 Drawing Figures

SEWING METHOD

This is a divisional application of Ser. No. 46,631, filed June 7, 1979, now U.S. Pat. No. 4,262,836, issued Apr. 21, 1981.

BACKGROUND OF THE INVENTION

1. Field of the Invention

The present invention relates to a method of sewing, with staples or tacks made of synthetic resins or of similar materials which, in effect, perform the function of a sewing thread, work in the form of a fabric, film, board or netting, such as various kinds of textiles, plastics, leather, paper, etc.

2. Description of the Prior Art

A typical prior method employs an industrial sewing machine wherein the formation of continuous seams is accomplished by entwining of a sewing thread or of two sewing threads, upper and lower. In this prior method, quite a complicated construction of the machine and accuracy in its adjustment are required to ensure accomplishment of the formation of perfect seams. As, besides, the sewing thread is indispensable, there are problems of wrinkles, contractions, etc., arising on the sewn piece of work, and of the sewing thread being broken, caught in the machine head or getting entangled in the course of operation.

An object of the present invention is to provide an improved, novel method of sewing or connecting.

Another object of this invention is to provide a method of sewing wherein the construction is simplified.

Still another object of the invention is to provide a method of sewing whereby the formation of seams is accomplished by means permitting easy adjustment and maintenance.

In the afore-mentioned prior method, a vertically reciprocating needle sews the work stitch by stitch over a long distance. As such, the operation extends over many hours and requires a high degree of skill and attentiveness of the operator. Accordingly, the improvement of productive efficiency at sewing factories has been held in check.

A further object of the present invention is to provide a method for sewing with an improvement in productivity to result in reduced costs.

SUMMARY OF THE INVENTION

To accomplish the foregoing objectives, there is provided a method for sewing or connecting works or pieces. First, staples or tacks having a function similar to a sewing thread are penetrated successively through the work placed on a bed. The staples or tacks are supplied and fed successively from a feeder provided over the work. Then, the shape of the extremities of the staples or tacks are changed so as not to be removed from the work. The penetrating step and the changing step are performed simultaneously at a plurality of points, or successively from point to point. As a result, seams or patterned seams adjacent to each other are accomplished to sew or connect the work.

In a preferred embodiment, the staples or tacks are made of thermoplastic or thermosetting synthetic resin. The changing step contains a heating operation for heating the extremities of the staples or tacks.

A specific sewing apparatus for carrying out the method of the invention has an internal cylinder provided to move slidably up and down in an external cylinder which is mounted on an end of an arm. A work presser for holding down a work placed on a bed is provided on a lower end of the internal cylinder. The staples or tacks are fed out successively from a lower portion of the internal cylinder by a feeder. The staples or tacks are then pushed out downwardly by a driver which moves slidably in the internal cylinder, so that the shape of the extremities of the staples or tacks are changed by an anvil.

The anvil has, in a preferred embodiment, a heating device, in which case the staples or tacks are of thermoplastic or thermosetting synthetic resin. In the feeder, the staples or tacks are spring-biased toward the inside of the internal cylinder.

BRIEF DESCRIPTION OF THE DRAWINGS

A detailed description of the invention will be made with reference to the accompanying drawings. Like numerals designate corresponding parts in the figures.

DESCRIPTION OF THE PREFERRED EMBODIMENT

Figure 1:
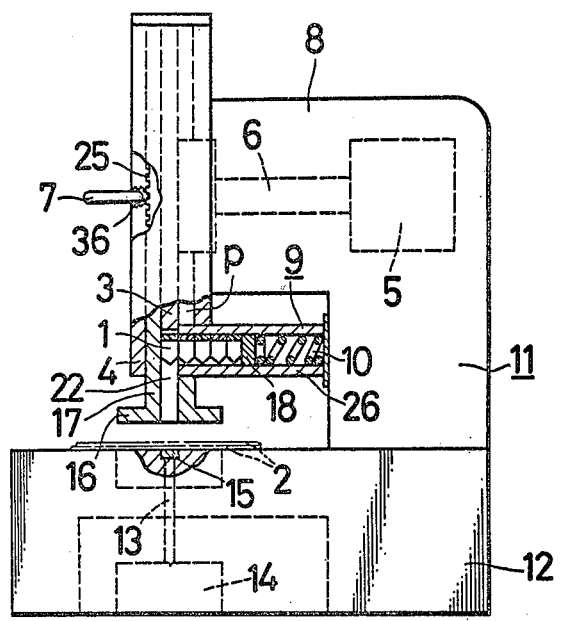
FIG. 1 is a side view partially shown in cross section of a sewing apparatus for carrying out the method according to the invention.
Figure 2:
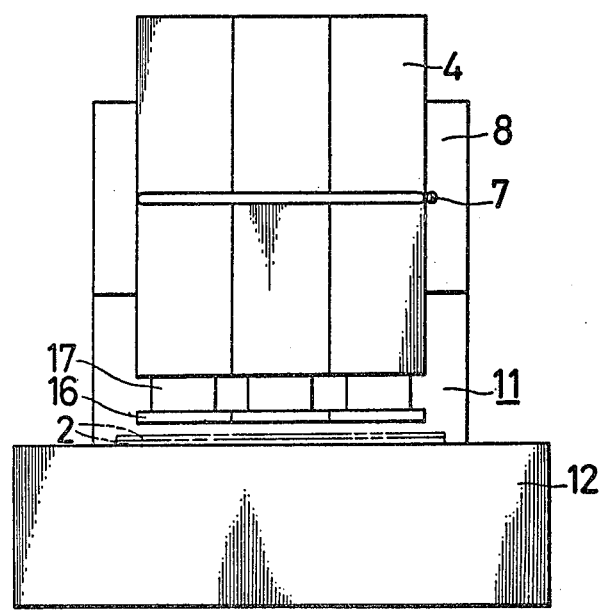
FIG. 2 is an elevational view of the sewing apparatus shown in FIG. 1.
Figure 3:
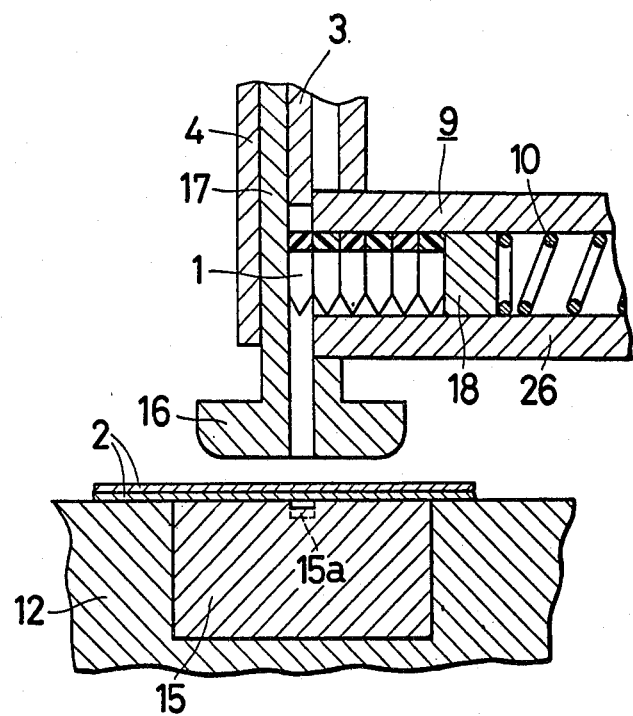
FIG. 3 is an enlarged cross sectional side view of the sewing apparatus partially omitting some components thereof.

There is shown in FIG. 1 a sewing apparatus 11 employed in the method of the present invention, which fundamentally contains an arm 8 and a bed 12. The sewing apparatus 11 has, as a power source, a built-in driving unit 5. At the end of the arm 8 is integrally fitted an external cylinder 4, and inside external cylinder 4 is provided an internal cylinder 17. There is provided, inside internal cylinder 17, a staple driver 3 which slides, responsive to a power transmission device 6, along the axial line of the cylinder. The power transmission device is driven by the driving unit 5. The staple driver 3 is capable of reciprocating motion toward the direction of the bed 12 and opposite thereto, such motion being effectuated by the cooperation of the driving unit 5 and the power transmission device 6. It is quite easy for those skilled in the art of this invention to build a machine having such construction as described above.

Figure 4:
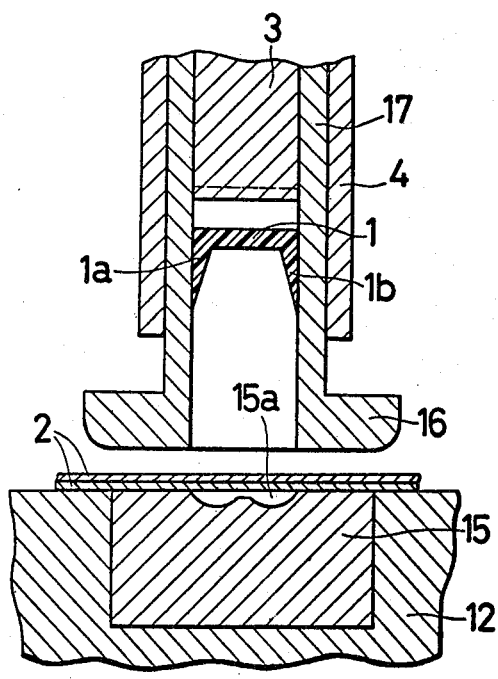
FIG. 4 is an enlarged cross sectional view of the sewing apparatus partially omitting some components thereof.

The internal cylinder 17 can be slip-fitted into the external cylinder 4 at the end of the arm 8 along the axial line of the cylinder, and there is provided, at the lower end of internal cylinder 17, a work presser 16 in the shape of a flange extending outward therefrom. This work presser 16 is, as it is lowered onto the bed 12, capable of holding down the work 2 placed on the bed 12. On the surface of the bed 12, where the center line of the staple driver 3 crosses it, there is fitted an anvil 15 which has a die hollow 15a which faces the lower end of the staple passage 22 of the internal cylinder 17. The die hollow 15a is, as will be seen from FIG. 4, so formed as to be approximately in the shape of the letter W in its longitudinal section, so that the legs 1-a and 1-b of the staple 1, which is in the shape of an inverted U, may be bent inwardly to approach each other as the staple is pressed down.

On the outer wall of the internal cylinder 17, there is formed a rack 25 extending along the axial line of the cylinder. A pinion 36, which is engaged with the rack 25, is pivotally supported on the external cylinder 4, and is rotated by the swing action of a lever 7. By the rotation of pinion 36, the internal cylinder 17, with the rack 25 engaging pinion 36, can move up and down, thus approaching the bed 12 and parting therefrom.

In the sewing equipment 11, there is provided a synthetic resin staple feeder 9. This staple feeder 9 consists of a tubular body 26 wherein is stored a number of synthetic resin staples arranged in a row and a spring 10 inside body 26 and which, through the medium of a pushing piece 18, always applies a force to push out a staple 1 into the internal cylinder 17. The anvil 15 is heated, at appropriate instants, by heating devices 13 and 14. At the lower part of the internal cylinder 17, there is cut out a hole "p" whereinto is fitted the staple feeder 9. The staple feeder is so devised as to always supply synthetic resin staples 1 into the internal cylinder 17 at appropriate moments.

In the following, a detailed description will be given, with reference to FIG. 5, of the processes of operation according to an embodiment of the present invention.

As the first step of operation, the work 2 is placed on the bed 12 of the sewing equipment 11, under the internal cylinder 17 which is slidingly fitted into the external cylinder 4 at the end of the arm 8, as illustrated in FIG. 1. The internal cylinder 17, inside the external cylinder 4, is caused to slide down by the action of the lever 7, and the work 2 is held down by the work presser 16.

Figure 5:
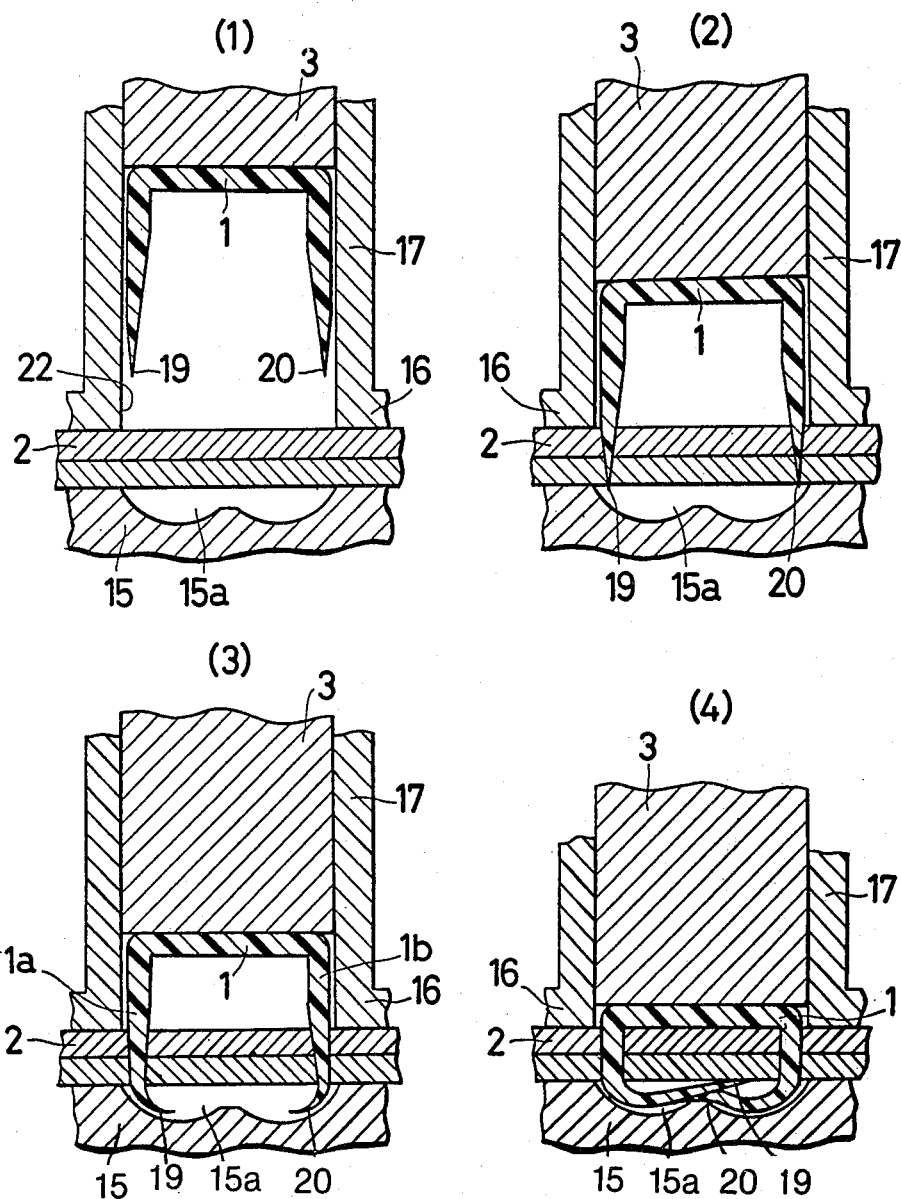
FIG. 5 is an enlarged cross sectional view showing the operational steps of the sewing apparatus to carry out the present method.
Figure 5:
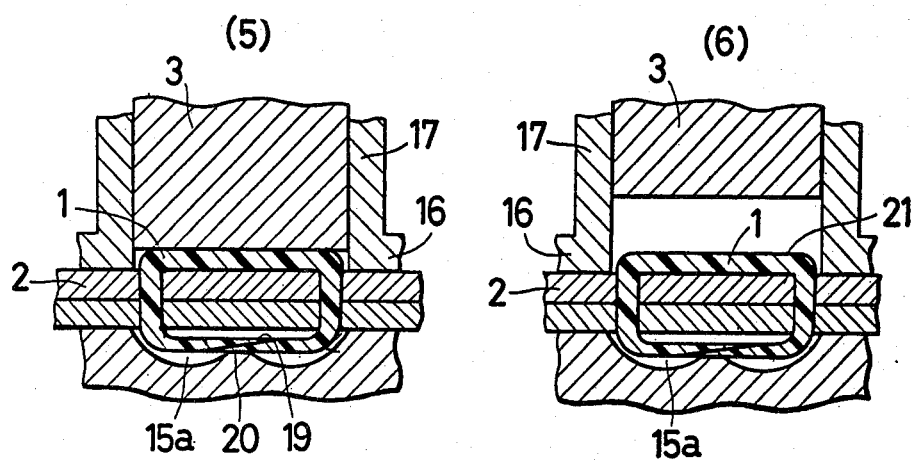

As the second step of operation, the synthetic resin staple 1, which has been supplied from the staple feeder 9 into the staple passage 22 of the internal cylinder 17, is pushed toward the work 2 by the staple driver 3 enclosed in the internal cylinder 17, as illustrated in FIG. 5-(1).

As the third step of operation, the synthetic resin staple 1, which has been pushed out by the staple driver 3, penetrates the work 2 and is forced into it, as illustrated in FIG. 5-(2).

As the fourth step of operation, the staple 1 is, as illustrated in FIG. 5-(3), pressed onto the anvil 15 on the surface of the bed 12. Consequently, the points 19 and 20 of the legs 1-a and 1-b, respectively, of the synthetic resin staple 1 are bent inwardly, sliding over the curved inside surface of the die hollow 15a of the anvil 15. Finally, as illustrated in FIG. 5-(4), the two points 19 and 20 overlap each other and are subjected to further pressure by the staple driver 3. This further pressure by staple driver 3 presses points 19 and 20 against a projection extending upwardly from the bottom hallow recess 15a and insures that the staple is tightly joined to the work 2.

Now, as the fifth and final step of the operation, the points 19 and 20 of the synthetic resin staple 1 are heated, by the heating devices 13 and 14 provided under the central part of the die hollow 15a of the anvil 15, to fuse together into an integral and uniform dimensional member on the underside of the work, as illustrated in FIG. 5-(5), the heating devices being so contrived as to apply heat at appropriate moments.

By the sequence of the first to fifth steps of operation as described above, the synthetic resin staple 1 is formed into a seam 21 in the shape of a loop, as illustrated in FIG. 5-(6).

The aforesaid process takes place, in accordance with the invention, successively at one point after another or simultaneously at many points, forming one or a plurality of the loop-like seams 21, as shown in FIG. 5-(6), at such points. Thus, the work is sewn up in a short space of time through a single or several processes as if with a single-needle sewing machine or with a complex system of sewing wherein an appropriate number of needles is employed. The expression "simultaneously at many points" as used hereinbefore is to be construed as including such cases as:

(1) where a number of seams are formed at the same time and such seams, being adjacent to each other, form a single, continuous line, thereby sewing the work together; and (2) where there is formed on the head of the staple or tack 1 a pattern which can be used for the purpose of embroidery work, and such patterns are applied at a plurality of predetermined points at the same time.

Single- or multi-point sewing units are arranged in a curved line, in a straight line, or are so disposed as to form an assembly of points, and the work is sewn up simultaneously at each point or successively from point to point.

As may be seen from the embodiment of the invention described in the foregoing, by making various modifications of the shape of the bed 12, the disposition of the arm 8 with the external cylinder 4 and the internal cylinder 17, and of the relative positions thereof, it is also possible to simultaneously sew up points, lines or faces of workpieces having a spherical surface, a curved surface or that which is in a more complicated form.

As for the power unit 5, power transmission device 6, and for the heating—fuse-bonding—devices 13 and 14, known techniques may be adopted.

It is to be understood that the mechanical contrivances to be adopted in putting the invention to practice are not confined to those which have been described in the embodiment of the invention set forth in the foregoing, but various modifications may be made within the scope of claims of this invention.

Figure 6:
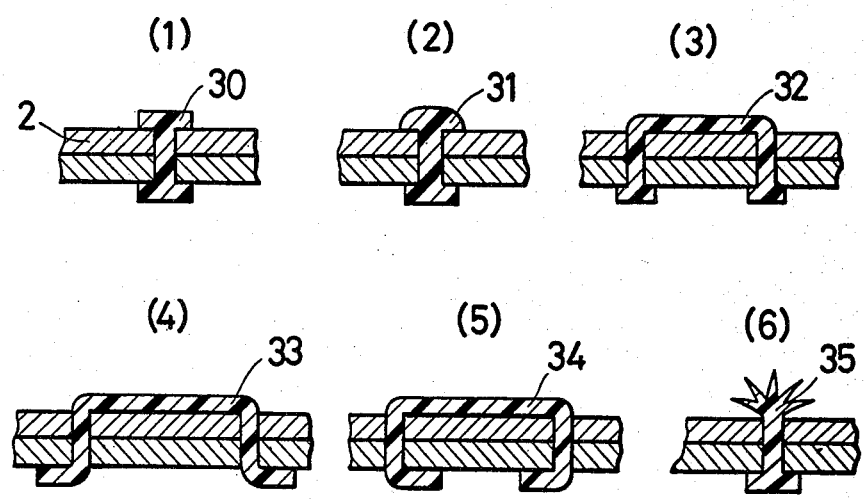
FIG. 6 is a cross sectional view of the other types of staples or tacks employable according to the invention.

The staple made of a synthetic resin or of a similar material is, in the embodiment of the invention as described above, deformed and made into a loop-like seam, and thus performs the function of a sewing thread used in a conventional sewing machine. When, for instance, the material is a synthetic resin, it is possible to color the staple, while seams made with such staples and the alignment of such staples are in no way inferior to those obtained with a conventional industrial sewing machine. Thus, coupled with the effect of coloring, it is possible to give a better appearance to the work. Further, as for the shape of the synthetic resin staple, or tack, it is also possible to use, besides one in the shape of an inverted U as described above, those in the shape of a nail, pin, rivet (flat- or convex-headed, or with other types of head), etc., as illustrated in FIGS. 6-(1) to (6). In FIGS. 6-(1) and (2), there are shown cases where a synthetic resin tack 30, or 31, which had a sharp point at the end of its shank, has penetrated the work 2 and such point has been deformed by heating and pressing, thereby forming a seam in the shape of, so to speak, a rivet. In FIGS. 6-(3), (4) and (5) are shown cases where a synthetic resin staple 32, 33 or 34, in the shape of an inverted U, has penetrated the work and the ends of its legs have been deformed by heating and pressing so as to form a seam, the processed and deformed ends of the legs being apart from each other in all these instances. In FIG. 6-(6), a synthetic resin tack 35 is formed into the shape of a rivet, this being for the purpose of an embroidery work. While, as for the shape of the seam, such forms as that of a broad-flange I-beam, of the letters L or T, etc. are conceivable depending upon the shape of the tack used, the previously described example shows a seam in the shape of a loop which is nearly rectangular as seen from the side, by way of showing an embodiment of the present invention. In respect, furthermore, of the feeding of synthetic resin staples, or tacks, as described above, such known methods as a pushing-out system, a cassette type, an insertion system, etc., may be brought into employment, and automation of the feeding of staples, or tacks, is feasible, whereby to permit an easy and efficient supply without a stop or suspension of the operation of the equipment.

With the conventional industrial sewing machines in general use, the sewing is effectuated by the use of a sewing thread which forms a continuous line of seams and, as a consequence, there has been a problem of occurrences of sewing wrinkles, the so-called "contractions", etc. By adopting the system of the point seam sewing with a series of single- or multi-point seams, in accordance with the present invention, it is possible to keep the aforesaid obstacles to a minimum. Further, by simultaneously sewing up a number of points in a single or a plurality of rows, it is possible to shorten the time required for sewing by a large measure, and as, besides, the necessity of moving the work can be eliminated, it becomes possible, as well, to lessen the amount of skill and attentiveness required of the operator in controlling the movement of the work, or to eliminate them altogethher. Since a thread was used for sewing heretofore, as was previously mentioned, there existed numerous problems involved in the sewing operation, such as the difficulty of working due to the type and nature of the thread, a limitation on the length of thread being fed, breakage of the thread, and so forth. In the present invention, however, staples, or tacks, made of synthetic resins or of similar materials are used instead of a thread, hence the degree of workability is not substantially affected by the kind of material used, and, besides, it is also possible to use staples, or tacks, of different materials from part to part of one and the same work. Still further, in the method of this invention, one can be free from the trouble of suspending the operation for adjustment of the machine, as is often the case with the conventional sewing machine when the thread has broken.

Other advantages of the method of the present invention include: it is possible to use synthetic resin staples, or tacks, of different colors and/or materials from place to place; even if there is an irregularity on the surface of the work or if it is fluted, it can be sewn with ease; and, by using staples, or tacks, of different sizes and colors, the machine can be adapted for embroidery work as well.

As will be seen from the foregoing, by technological creations arising from the present invention, a great improvement is brought about in the efficiency and productivity of the related industries, and a chain of many new improvements in the operation of works in such fields will be made practicable.

While the sewing method of the invention has been shown in a preferred construction thereof, it will be obvious that those skilled in the art, in view of this specification, will be able to construct structures of different construction which are still within the true spirit and scope of this invention.

What is claimed is:

1. A sewing method comprising:
   providing a sewing apparatus which comprises:
   a bed adapted to receive thereon work;
   a rigid arm fixedly positioned above said bed, said arm having fixed thereto a stationary external cylinder;
   an internal cylinder mounted within said external cylinder for vertical movement with respect thereto toward and away from said bed, said internal cylinder having therein a vertical passage;
   a staple feeder attached to said external cylinder;
   said internal cylinder having at a lower end thereof an outwardly extending work presser;
   a staple driver mounted for vertical movement within said vertical passage;
   a recessed anvil positioned in said bed at a location confronting the lower end of said vertical passage, said anvil having extending upwardly from the bottom thereof a projection; and
   a heater located adjacent said anvil;
   moving said internal cylinder vertically upwardly within said external cylinder to a raised position spaced from said bed;
   positioning work on said bed;
   moving said internal cylinder vertically downwardly within said external cylinder to a lowered position whereat said work presser presses said work against said bed;
   positioning within said staple feeder a supply of synthetic resin staples each having an inverted U-shaped configuration with spaced downwardly extending legs;
   feeding said staples sequentially from said staple feeder through said external cylinder and said internal cylinder into said vertical passage;
   moving said staple driver downwardly within said vertical passage and thereby driving a leading of said staples downwardly through said vertical passage, penetrating said legs of said staple through said work on said bed, pressing said legs of said staple against said anvil, thereby bending said legs of said staple inwardly into abutting relationship with each other at a position beneath said work, and pressing said abutted staple legs against said projection and into tight attachment with said work; and
   operating said heater and thereby heating and fusing together said abutted staple legs to thus form an integral and uniform dimensioned member on the underside of said work.

* * * * *